July 8, 1952     E. A. WINTER     2,602,726
PROCESS FOR THE PRODUCTION OF SODIUM BIFLUORIDE
Original Filed June 23, 1948
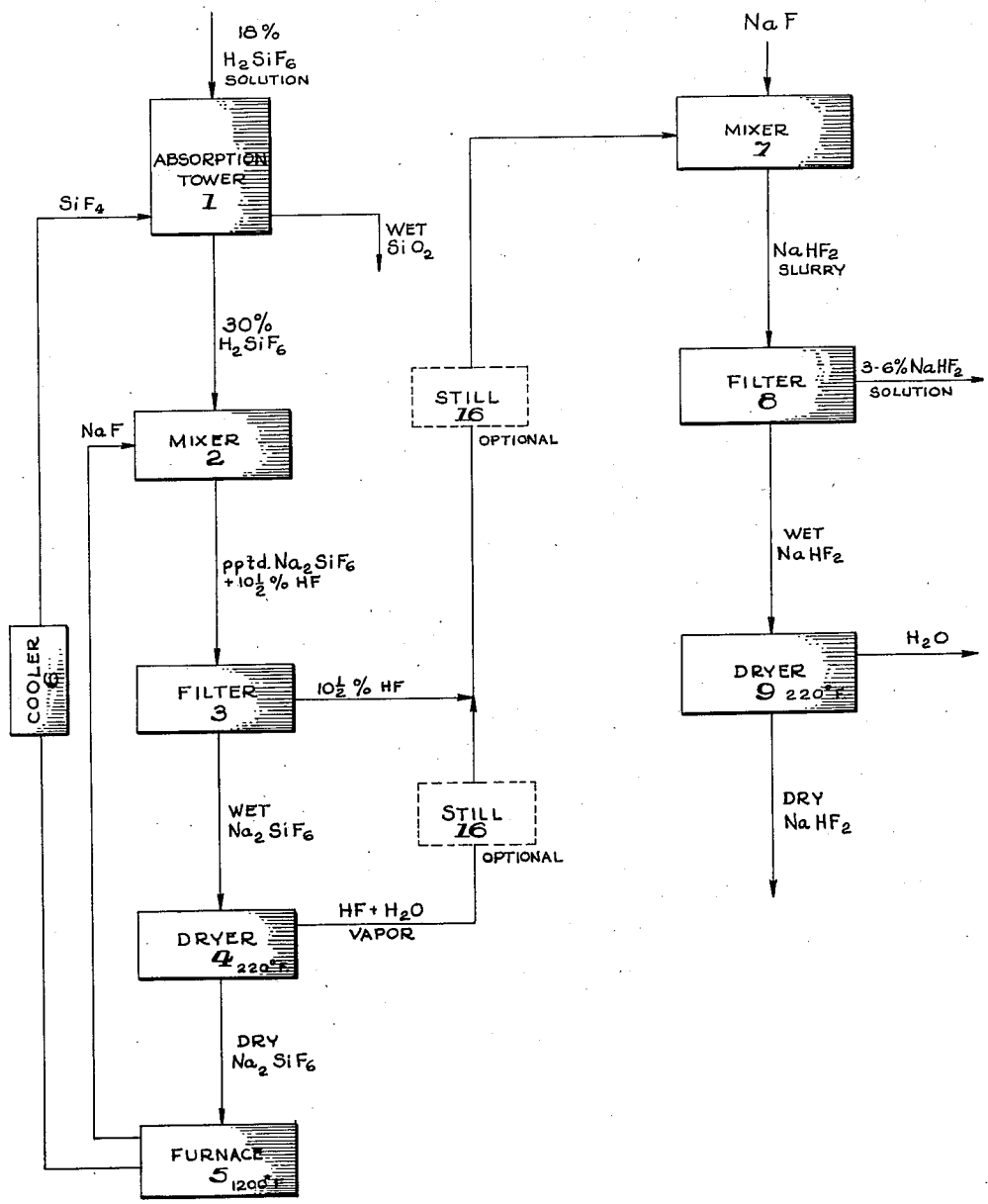
INVENTOR
*Ernest A. Winter*
BY *Cameron, Kerkam & Sutton*
ATTORNEYS

UNITED STATES PATENT OFFICE 2,602,726

PROCESS FOR THE PRODUCTION OF SODIUM BIFLUORIDE

Ernest A. Winter, College Park, Ga., assignor to Tennessee Corporation, New York, N. Y., a corporation of New York Original application June 23, 1948, Serial No. 34,716. Divided and this application September 24, 1951, Serial No. 248,031

1 Claim. (Cl. 23—88)

This invention relates to the production of essentially silicon-free fluorine compounds and more particularly to the production of sodium bifluoride from hydrofluosilicic acid ($H_2SiF_6$).

This application is a division of copending application Serial No. 34,716, filed June 23, 1948, now Patent No. 2,588,786.

The process of the present invention may employ hydrofluosilicic acid as the starting compound and employs $Na_2SiF_6$, NaF and $H_2O$ at different stages in the process to produce HF; sodium bifluoride ($NaHF_2$); sodium fluosilicate ($Na_2SiF_6$); and sodium fluoride (NaF).

Heretofore sodium bifluoride has been prepared from HF made from fluorspar and sulphuric acid. This fluorspar must be of high grade and substantially free of impurities to produce the desired end products. Deposits of this fluorspar are now being depleted and the process of the present invention makes use of a hitherto waste product, $H_2SiF_6$, to produce sodium bifluoride on a competitive basis with known commercial processes. $H_2SiF_6$ is a by-product and is recovered from waste gases generated in superphosphate manufacture.

It is accordingly an object of the present invention to produce sodium bifluoride from hydrofluosilicic acid.

Another object of the present invention is to produce sodium bifluoride from dilute hydrofluoric acid made from hydrofluosilicic acid.

Another object of the present invention is to produce sodium bifluoride from hydrofluosilicic acid without employing expensive raw materials.

Another object of the present invention is to produce sodium bifluoride from hydrofluosilicic acid by processes in which by-products may be recycled in such processes to reduce the cost of the raw materials employed therein.

Other and further objects of the present invention will appear from the following description.

In the accompanying drawing a flow sheet is provided of an illustrative embodiment of the process of the present invention.

It is well known to the art that hydrofluoric acid and water form a constant boiling mixture which contains approximately 38% HF and 62% $H_2O$. If such a solution has less than 38% HF it cannot be fractionated to give a higher strength than 38%. If such a solution has approximately 80% HF it can be fractionated to yield substantially 100% HF gas and a liquid residue of 40–50% HF. In the following description of my invention when I refer to dilute HF solutions I mean solutions having an HF content of less than that of the constant boiling mixture. I employ the term "concentrated HF solutions" to indicate those solutions having a greater content of HF than the constant boiling mixture.

Thorpe's Dictionary of Applied Chemistry, 4th Edition, volume 5, page 278 et seq., describes present methods for producing HF which have heretofore been based primarily upon the reaction of relatively pure fluorspar and sulphuric acid. This HF can be reacted with, e. g., NaOH to form $NaHF_2$. Since, as heretofore noted, deposits of high grade fluorspar are being depleted it is now necessary that other sources of basic material be found for the production of sodium bifluoride; and hydrofluosilicic acid is a by-product, and in many cases a waste material, of the acidulation of phosphate rock in the fertilizer industry. Hydrofluosilicic acid has heretofore been used to produce fluosilicates employing the reactions:

(1)  $2NaCl + H_2SiF_6 \rightarrow Na_2SiF_6\downarrow + 2HCl$

The patent to Buchner No. 1,664,348 discloses a reaction in which $H_2SiF_6$ is reacted with sodium fluoride to prepare an HF solution employing the following reaction:

(2)  $H_2SiF_6 + 2NaF \rightarrow Na_2SiF_6\downarrow + 2HF$

I have found that the dilute HF solution of formula (2) may be treated by the addition of NaF to the solution to precipitate $NaHF_2$, a relatively insoluble compound, according to the following formula:

(3)  $NaF + HF \rightarrow NaHF_2\downarrow$

The $NaHF_2$ may then be filtered off and dried.

The several formulae discussed above may be utilized in an economic commercial process as disclosed in the flow diagram of the drawing. In this diagram an 18% $H_2SiF_6$ solution, which is obtained as a by-product from the manufacture of phosphate fertilizer, is taken to an absorption tower 1 where it is treated with a strong $SiF_4$ gas which may be refluxed from a later stage in the process as will more fully appear hereinafter. $H_2SiF_6$ is formed in absorber 1 having approximately 30% concentration with the precipitation of silica or silicic acid according to the formula:

(4)  $3SiF_4 + 2H_2O \rightarrow 2H_2SiF_6 + SiO_2\downarrow$

The $SiO_2$ is filtered off and the $H_2SiF_6$ solution is removed to mixer 2 where at least an equivalent amount of solid sodium fluoride (NaF) is added. The NaF may be recycled to mixer 2 from a later stage of the process as will appear more fully hereinafter.

The following reaction takes places in mixer 2:

(5)  $2H_2SiF_6 + 4NaF \rightarrow 2Na_2SiF_6\downarrow + 4HF$

It should be noted that if too much NaF is added the otherwise free HF will be precipitated as $NaHF_2$. The products of reaction (6) are then taken to filter 3 where the precipitated $Na_2SiF_6$ is separated from the HF solution. The HF solution is taken to mixer 7. The wet $Na_2SiF_6$ is taken from filter 3 to dryer 4 where it is dried and the HF gas and water vapor produced therein are led from dryer 4 to mixer 7. The dried $Na_2SiF_6$ is removed to furnace 5 where it is calcined to produce $SiF_4$. This $SiF_4$ is refluxed through a suitable cooler 6 to absorption tower 1 and the NaF which is produced is refluxed to mixer 2. The reaction taking place in furnace 5 is:

(6)  $2Na_2SiF_6 + heat \rightarrow 4NaF + 2SiF_4\uparrow$

The HF solution taken from filter 3 and dryer 4 may be passed through suitable stills 16 before admission to mixer 7 to fractionate such solutions to 30–35% HF. Stills 16 are shown as optional in the drawing. Where fuel costs are low it is desirable to so fractionate these HF solutions because the resulting yield of $NaHF_2$ will be higher.

The HF solutions from filter 3 and dryer 4, fractionated or not as the case may be, are mixed in mixer 7 with NaF. The reaction taking place in mixer 7 is:

(7)  $4NaF + 4HF \rightarrow 4NaHF_2\downarrow$

The NaF may be prepared in accordance with equations (1) and (7). The $NaHF_2$ is taken from mixer 7 in the form of a slurry to a suitable filter 8 where the precipitated $NaHF_2$ is removed to a suitable dryer 9. A 3–6% $NaHF_2$ solution is obtained from filter 8. It may be discarded or used for other purposes such as making $Na_2SiF_6$ by the addition of $H_2SiF_6$.

The precipitated $NaHF_2$ is dried in dryer 9 and in dry state constitutes a commercial article.

In the process described above with reference to the flow diagram of the drawing the concentrations there employed may be varied and if a stronger $H_2SiF_6$ solution is available then the yield will be higher. Room temperatures are employed in the various stages of the process except in the dryers, furnaces, calciners, etc. Recycling of NaF and $SiF_4$ reduces the cost of the operation but it is obvious that NaF and/or $Na_2SiF_6$ must be added to the system to make up for losses.

By the present invention I have provided a novel process for the production of sodium bifluoride from hydrofluosilicic acid; in which sodium bifluoride is produced from dilute HF; and in which this compound is produced from hydrofluosilicic acid without the use of expensive raw materials.

Changes to or modifications of the above described illustrative embodiments of my process may now be suggested to those skilled in the art without departing from my inventive concept. The various temperatures and concentrations employed are illustrative and may be varied. Heat generated in the calciners and furnaces may be employed to preheat and to dry at various stages of the processes. Reference should therefore be had to the appended claim to determine the scope of this invention.

What is claimed is:

In a process for obtaining sodium bifluoride from hydrofluosilicic acid the steps of treating a solution of hydrofluosilicic acid with sodium fluoride to form hydrofluoric acid in solution and precipitate sodium fluosilicate, separating the sodium fluosilicate from the hydrofluoric acid solution, heat treating the sodium fluosilicate to obtain sodium fluoride, cycling the sodium fluoride back to the step of mixing the solution of hydrofluosilicic acid with sodium fluoride and treating the hydrofluoric acid solution with sodium fluoride to precipitate sodium bifluoride.

ERNEST A. WINTER.

REFERENCES CITED

The following references are of record in the file of this patent:

UNITED STATES PATENTS

| Number | Name | Date |
|---|---|---|
| 1,664,348 | Buchner | Nov. 27, 1928 |

OTHER REFERENCES

"Thorpe's Dictionary of Applied Chemistry," vol. V, 4th Ed., page 282. Longmans, Green & Co., N. Y.

J. W. Mellor's "A Comprehensive Treatise on Inorganic and Theoretical Chemistry," vol. 2, page 516, 1922 Ed; vol. 6, page 944, 1925 Ed. Longmans, Green & Co., N. Y.